(12) United States Patent
Tsuchiya et al.

(10) Patent No.: US 8,368,734 B2
(45) Date of Patent: Feb. 5, 2013

(54) EXPOSURE DEVICE, IMAGE FORMING APPARATUS, EXPOSURE CONTROL METHOD AND COMPUTER-READABLE MEDIUM

(75) Inventors: Ken Tsuchiya, Ebina (JP); Michio Taniwaki, Ebina (JP); Fumihiko Ogasawara, Ebina (JP); Toshio Hisamura, Kawasaki (JP); Osamu Yasui, Ebina (JP); Michihiro Inoue, Ebina (JP)

(73) Assignee: Fuji Xerox Co., Ltd., Tokyo (JP)

( * ) Notice: Subject to any disclaimer, the term of this patent is extended or adjusted under 35 U.S.C. 154(b) by 755 days.

(21) Appl. No.: 12/548,964

(22) Filed: Aug. 27, 2009

(65) Prior Publication Data

US 2010/0214626 A1  Aug. 26, 2010

(30) Foreign Application Priority Data

Feb. 25, 2009  (JP) ................................ 2009-041807

(51) Int. Cl.
 *B41J 2/435* (2006.01)
 *B41J 2/47* (2006.01)
(52) U.S. Cl. ....................................... 347/237; 347/247
(58) Field of Classification Search .................. 347/237, 347/240, 247, 251–254, 246, 236; 382/274
See application file for complete search history.

(56) References Cited

U.S. PATENT DOCUMENTS

| 7,945,096 B2 * | 5/2011 | Okada ............................ 382/181 |
| 2003/0025785 A1 * | 2/2003 | Nihei et al. .................... 347/250 |
| 2006/0290906 A1 * | 12/2006 | Yokoyama et al. ............. 355/18 |

FOREIGN PATENT DOCUMENTS

| JP | 05-169724 A | | 7/1993 |
| JP | 05169724 A | * | 7/1993 |
| JP | 2005-246909 A | | 9/2005 |

* cited by examiner

*Primary Examiner* — Hai C Pham
(74) *Attorney, Agent, or Firm* — Sughrue Mion, PLLC

(57) ABSTRACT

An exposure device includes a plurality of light-emitting elements, a lighting driver, a first storage, a reader, a shading correction unit and a second storage. The lighting driver drives and lights up the light-emitting elements based on image data. The first storage stores light amount unevenness correction values of the respective light-emitting elements. The reader reads the light amount unevenness correction values stored in the first storage. The shading correction unit executes shading correction for the light amount unevenness correction values read by the reader. The second storage stores correction values obtained by having the shading correction unit to execute the shading correction for the light amount unevenness correction values. The lighting driver controls light power of the respective light-emitting elements based on the correction values stored in the second storage.

3 Claims, 19 Drawing Sheets

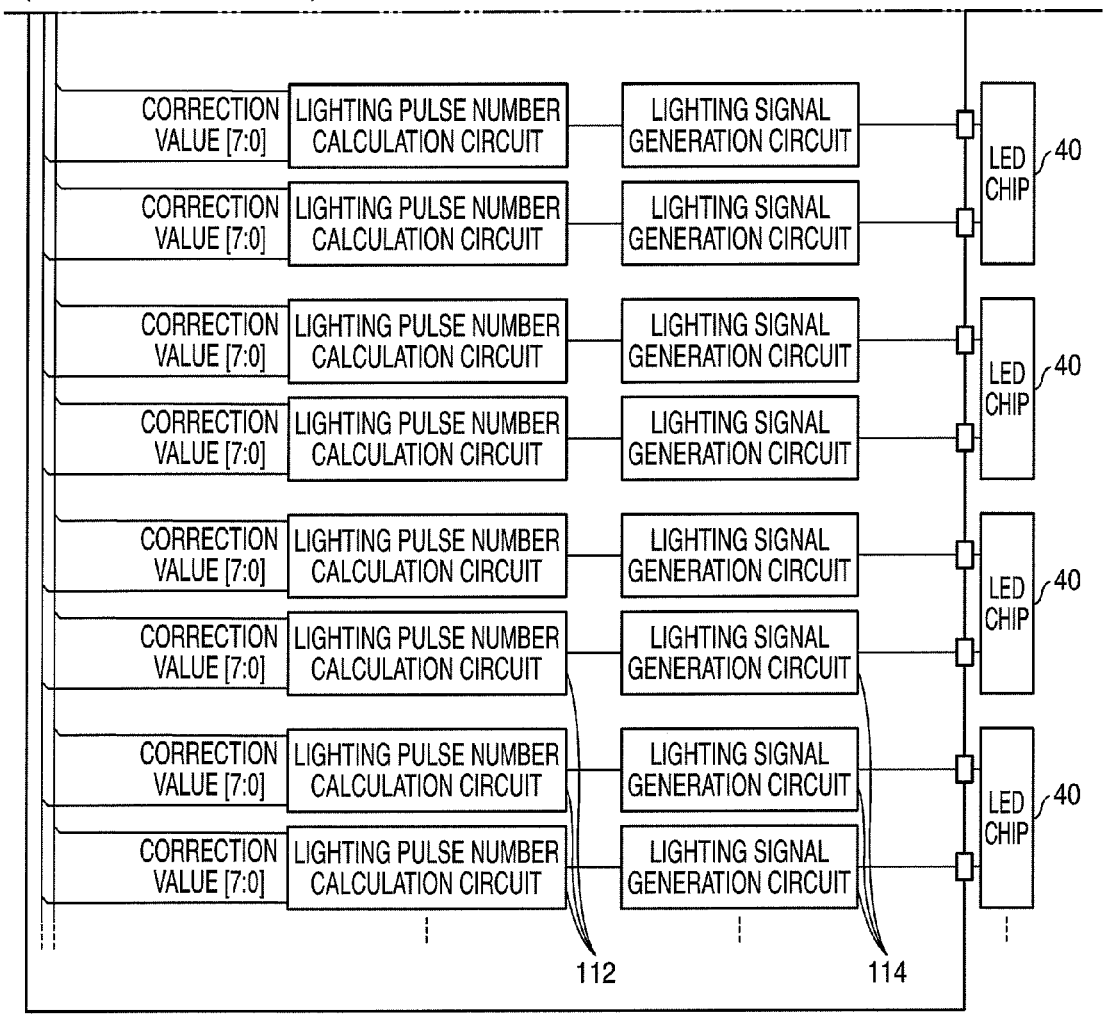

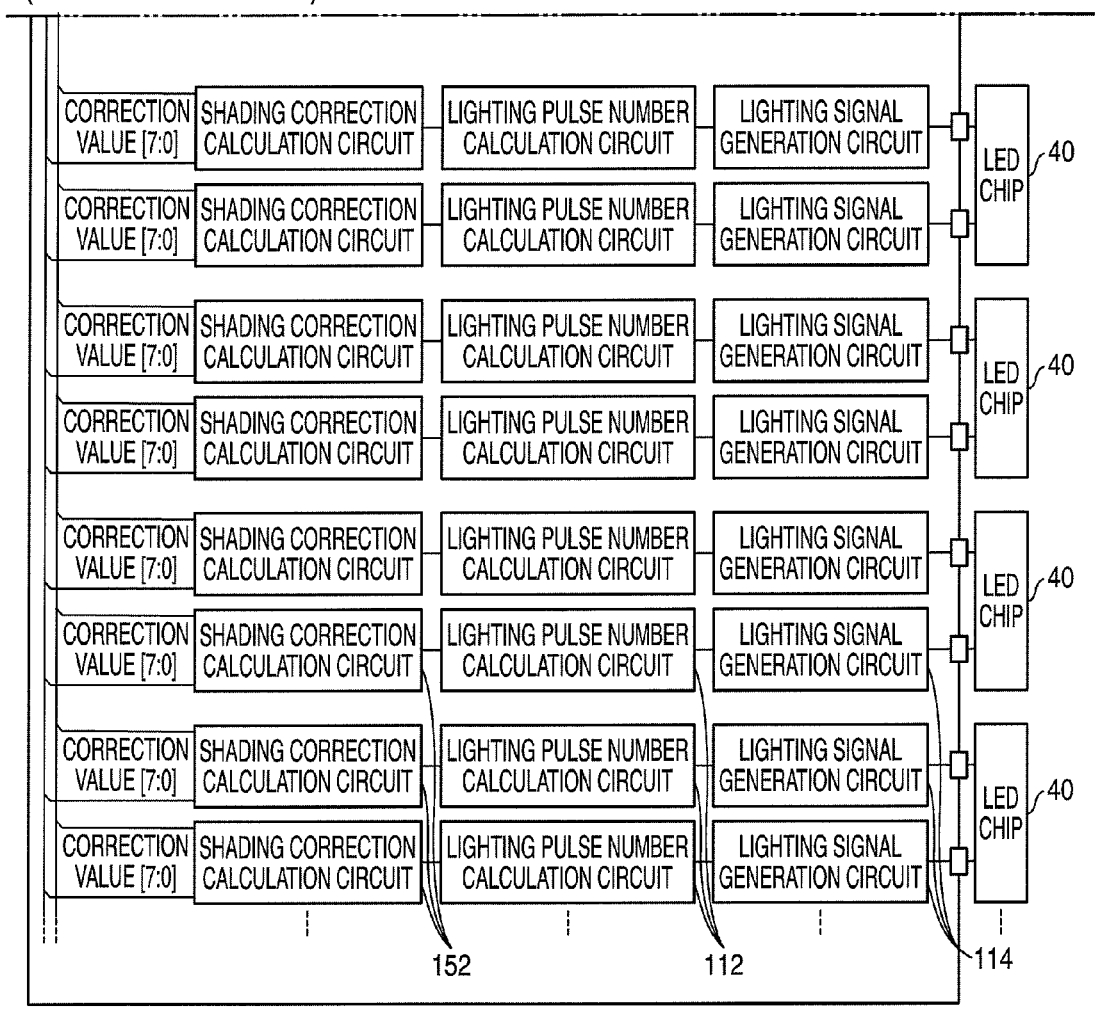

US 8,368,734 B2

EXPOSURE DEVICE, IMAGE FORMING APPARATUS, EXPOSURE CONTROL METHOD AND COMPUTER-READABLE MEDIUM

CROSS-REFERENCE TO RELATED APPLICATIONS

This application is based on and claims priority under 35 USC 119 from Japanese Patent Application No. 2009-41807 filed on Feb. 25, 2009.

BACKGROUND

The present invention relates to an exposure device, an image forming apparatus, an exposure control method and a computer-readable medium storing a program that causes a computer to execute exposure control processing.

SUMMARY

According to an aspect of the invention, an exposure device includes a plurality of light-emitting elements, a lighting driver, a first storage, a reader, a shading correction unit and a second storage. The lighting driver drives and lights up the light-emitting elements based on image data. The first storage stores light amount unevenness correction values of the respective light-emitting elements. The reader reads the light amount unevenness correction values stored in the first storage. The shading correction unit executes shading correction for the light amount unevenness correction values read by the reader. The second storage stores correction values obtained by having the shading correction unit to execute the shading correction for the light amount unevenness correction values. The lighting driver controls light power of the respective light-emitting elements based on the correction values stored in the second storage.

BRIEF DESCRIPTION OF THE DRAWINGS

Exemplary embodiments of the invention will be described in detail based on the accompanying drawings, wherein.

DETAILED DESCRIPTION

Hereinafter, exemplary embodiments of the present invention of the invention will be described.

Figure 1:
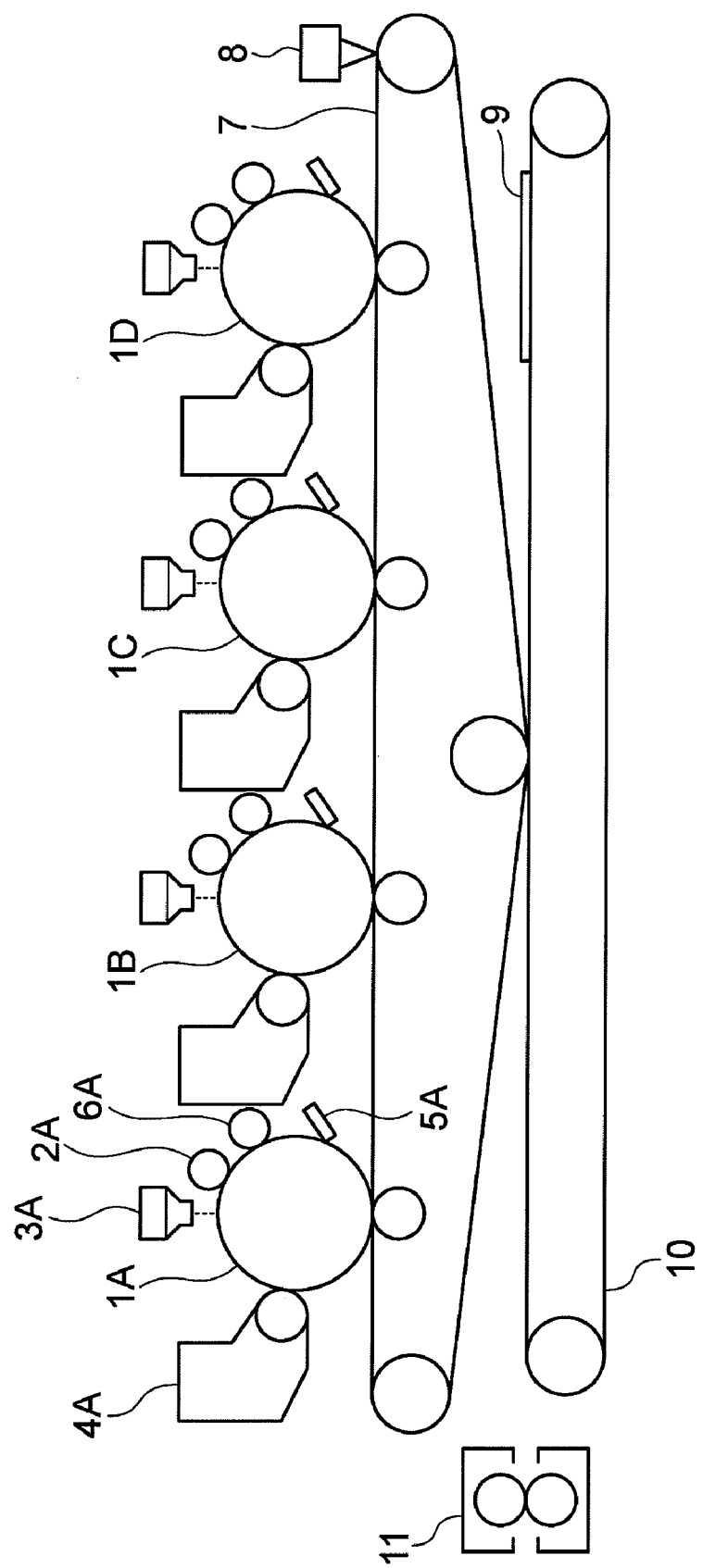
FIG. 1 is a view showing the entire configuration of an image forming apparatus according to an exemplary embodiment of the present invention.

FIG. 1 is a view showing the entire configuration of an image forming apparatus according to an exemplary embodiment of the present invention.

The image forming apparatus is able to form a color image on a printing medium by a tandem type electrophotography system. The image forming apparatus is configured so that four drum-shaped photosensitive bodies 1A, 1B, 1C and 1D are arranged around an intermediate transfer belt 7. Various types of devices and units to form images by the electrophotography process are disposed around the photosensitive bodies 1A, 1B, 1C and 1D, respectively. Since the configurations of these devise and units are common to the photosensitive bodies 1A, 1B, 1C and 1D, herein, description is given of devices and units around the photosensitive body 1A as representative. That is, a charger 2A, a print head 3A, a developing device 4A, a cleaner 5A, and a charge neutralizer 6A are arranged around the photosensitive body 1A. A toner image is formed on the photosensitive body 1A with a yellow (Y) developing agent (also, in the following description, the photosensitive bodies 1A, 1B, 1C and 1D may be collectively referred to as the "photosensitive body" 1, and this is the same as for the charger 2A, the print head 3A, the developing device 4A, the cleaner 5A, and the charge neutralizer 6A). Similarly, toner images of magenta (M), cyan (C) and black (K) are formed on the photosensitive bodies 1B, 1C and 1D, respectively. The respective toner images are stacked on each other and transferred onto the intermediate transfer belt 7 while matching their positions based on detection signals of a registration sensor 8, and all the toner images are collectively transferred onto a recording sheet 9. The recording sheet 9 is conveyed to a fixing device 11 by means of a sheet conveyance belt 10. The fixing device 11 fixes the toner images on the recording sheet 9 (an example of a printing medium), thereby forming a color image.

Since, in such a tandem type color image forming apparatus, image forming units of respective colors Y, M, C and K are independently arranged, it may be required to downsize the respective units. Therefore, it may demanded for the print head that a space occupancy ratio around the photosensitive body circumference is downsized to as minimum extent as possible. An LED print head may be adopted, which uses an LED array in which a large number of light-emitting diodes (LEDs) (an example of light-emitting elements) are arranged.

In the following description, detailed description is given on an exposure device for exposing a surface of the photosensitive body 1 using the print head 3A.

Figure 2:
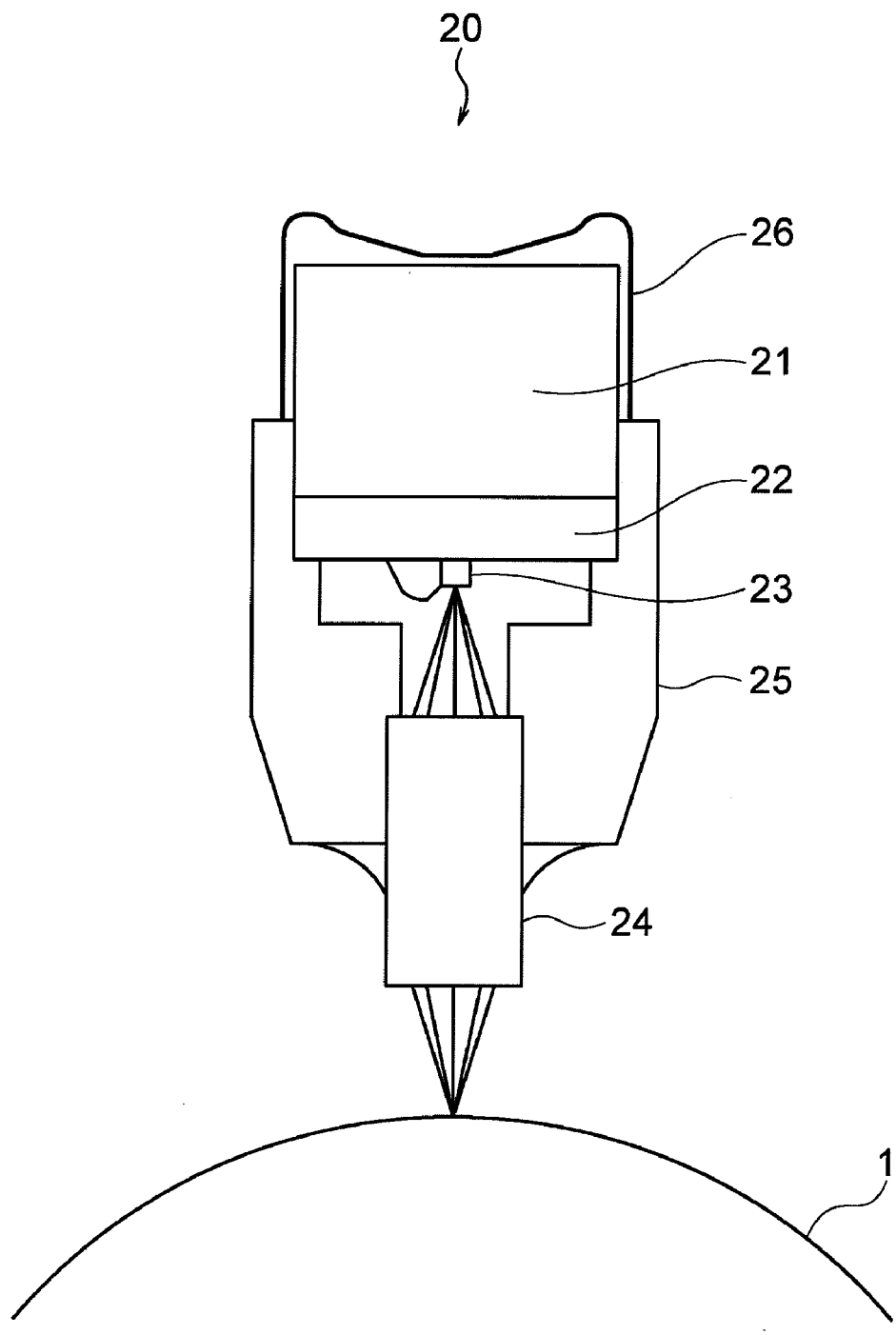
FIG. 2 is a sectional view showing the configuration of an LED print head of the image forming apparatus according to one exemplary embodiment of the present invention.

FIG. 2 is a sectional view showing the configuration of an LED print head.

The LED print head 20 is a light-emitting element for exposure of the photosensitive body and is provided on the print head 3. The LED print head 20 is provided with a housing 21 serving as a supporting body, a printed circuit board 22 having a light-emitting element array driver 50 (which will be described later) mounted thereon, an LED array 23 for emitting exposure light, a SELFOC® lens array (SELFOC lens is a registered trademark of Nippon Sheet Glass Co., Ltd.) for focusing light from the LED array 23 onto the surface of the photosensitive drum 1, a SELFOC lens array holder 25 for supporting the SELFOC lens array 24 and shielding the LED array 23 from the outside, and a leaf spring 26 for pressing the housing 21 in the SELFOC lens array 24 direction.

The housing 21 is formed of an aluminum or stainless steel block or made of an aluminum or stainless steel sheet material, and supports the printed circuit board 22 and the LED array 23. Also, the SELFOC lens array holder 25 supports the housing 21 and the SELFOC lens array 23, and is configured so that the light-emitting point of the LED array 23 is aligned with the focal point of the SELFOC lens array 24. Further, the SELFOC lens array holder 25 is disposed so as to closely seal the LED array 23. Therefore, no foreign substances such as dust are adhered to the LED array 23 from the outside. On the other hand, the leaf spring 26 presses in the direction of the SELFOC lens array 24 via the housing 21 so as to maintain the positional relationship between the LED array 23 and the SELFOC lens array 24.

The LED print head 20 is configured so as to be movable in an optical axis direction of the SELFOC lens array 24 by an adjustment screw (not illustrated), and is adjusted so that an image formation position (the focal point) of the SELFOC lens array 24 is located on the surface of the photosensitive drum 1.

In the LED array 23, as described later, plural LED chips 40 are accurately arranged on a chip substrate to form a row and to be parallel to a shaft direction of the photosensitive drum 1. In the SELFOC lens array 24, self-converging fibers are accurately arranged to form a row and to be parallel to the shaft direction of the photosensitive drum 1. And, light from the LED array 23 is focused on the surface of the photosensitive drum 1, and a latent image is formed thereon.

Figure 3:
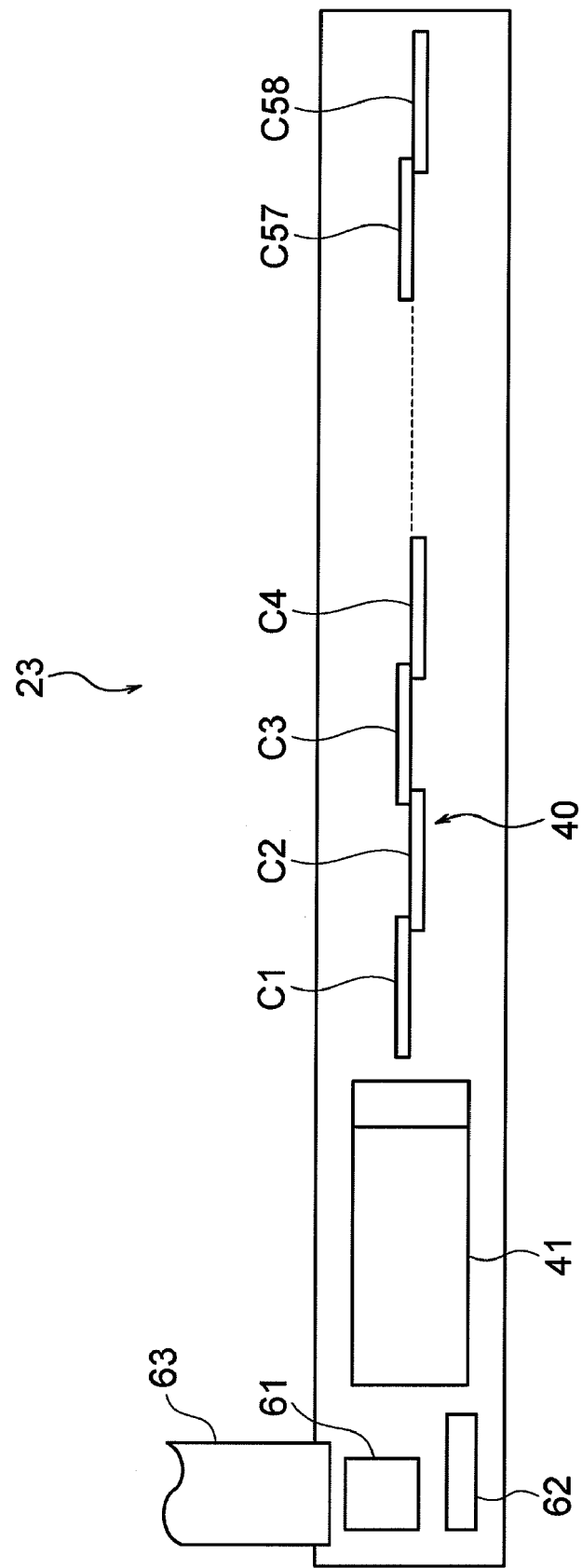
FIG. 3 is a plan view of an LED array 23, having plural LED chips arranged therein, of the image forming apparatus according to one exemplary embodiment of the present invention.

FIG. 3 is a plan view of the LED array 23 having plural LED chips 40 arranged therein.

In the LED array 23, 58 LED chips 40 (C1 through C58) are accurately arranged to form a row and to be parallel to the shaft direction of the photosensitive drum 1. The respective LED chips 40 are arrayed in a zigzag manner. And, in the LED print head 20, 128 LEDs are incorporated in each of the LED chips 40. In addition, the LED array 23 is provided with a driver 41 to drive the LED chips 40. Further, the LED array 23 is provided with a power circuit 61 to stabilize an output voltage, an EEPROM 62 to store light amount correction value data of the respective LEDs which constitute the LED chip 40, and a harness 63 for transmitting and receiving signals between the LED array 23 and an image forming apparatus main body.

Self-scanning LEDs are adopted in the LED print head 20. The self-scanning LED adopts a thyristor structure as a portion equivalent to a switch that selectively turns on and off a light-emitting point. By adopting the thyristor structure, it becomes possible to arrange the switching portion on the same chip as that of the light-emitting point, and turn-on timing and turn-off timing of the switch are selectively controlled for lighting by two signal lines. The data line can be made common, and the wiring thereof is simplified.

Figure 4:
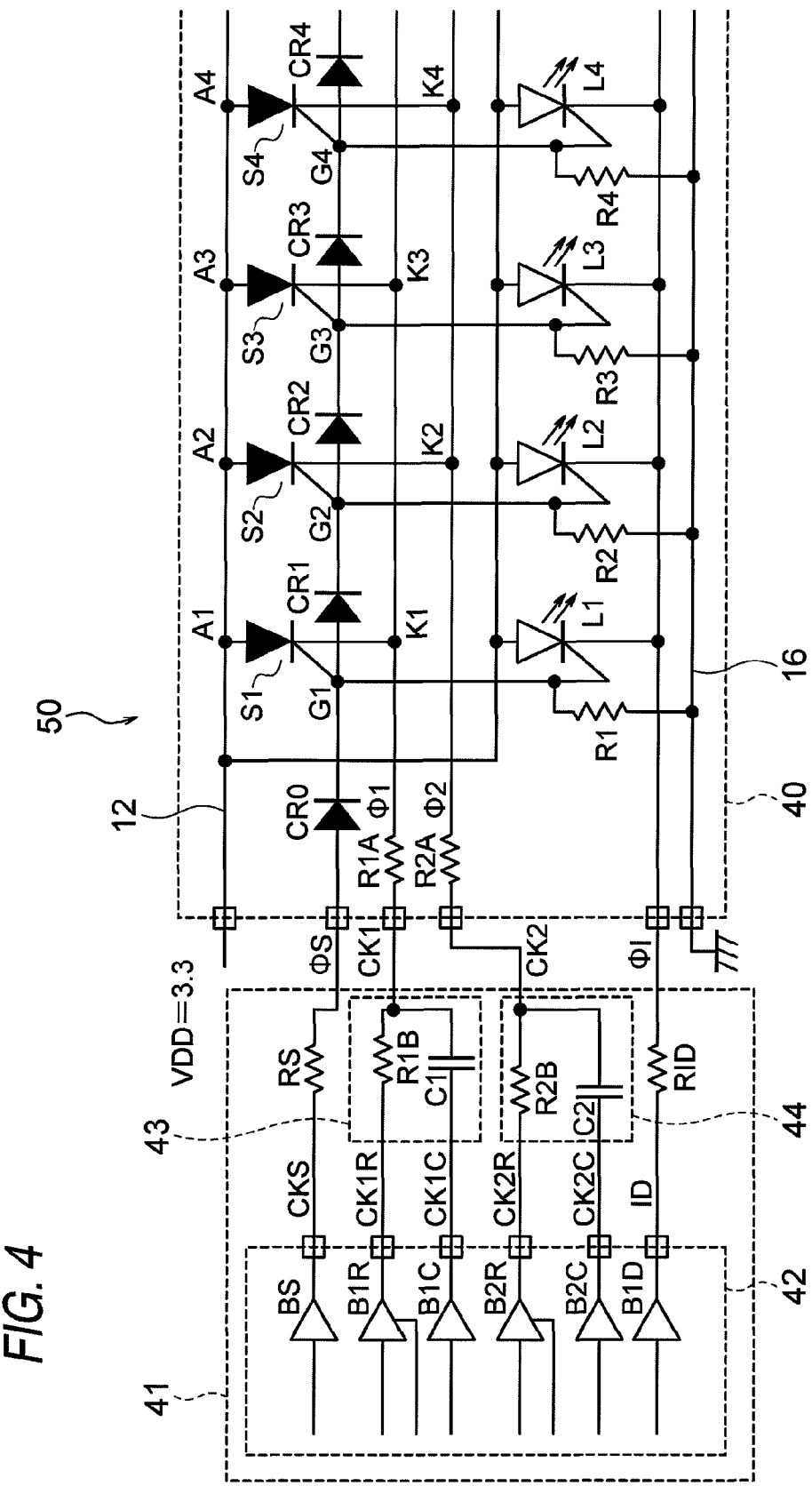
FIG. 4 is a circuit diagram showing a light-emitting element array driving unit in the LED print head, for which a self-scanning LED is adopted, of the image forming apparatus according to one exemplary embodiment of the present invention.

FIG. 4 is a circuit diagram showing the light-emitting element array driver 50 in the LED print head 20 in which the self-scanning LEDs are adopted.

In FIG. 4, the light-emitting element array driver 50 is provided with the LED chip 40 and the driver 41 to drive the LED chip 40. The LED chip 40 includes "n" thyristors S1, S2, ... Sn (in the figure, the thyristors are appropriately illustrated by equivalent circuits), "n" light-emitting diodes (LEDs) L1, L2, ... Ln, and "n+1" diodes CR0, CR1, CR2, ... CRn, etc. In addition, the driver 41 includes resistors RS, R1B, R2B, RID, capacitors C1, C2 and a signal generation circuit 42, etc. Also, in FIG. 4, only some of the thyristors, the light-emitting diodes, and the diodes, which are provided in the LED chip 40, are illustrated.

Hereinafter, description is given on a circuit configuration of the LED chip 40 and the driver 41. Anode terminals A1 through An of the respective thyristors S1 through Sn are connected to the power line 12. A power voltage VDD (VDD=3.3V) is supplied to the power line 12. Cathode terminals K1, K3, ... of the thyristors having an odd number (A1, A3, ...) are connected to the signal generation circuit 42 via the resistor R1A. A level-shift circuit 43 in which a signal line having the resistor R1B connected thereto and a signal line having the capacitor C1 connected thereto are branched in parallel to each other is connected between the resistor R1A and the signal generation circuit 42. Furthermore, cathode terminals K2, K4, ... of the thyristors having an even number (S2, S4, ...) are connected to the signal generation circuit 42 via the resistor R2A. A level-shift circuit 44 in which a signal line having the resistor R2B connected thereto and a signal line having the capacitor C2 connected thereto are branched in parallel to each other is connected between the resistor R2A and the signal generation circuit 42.

On the other hand, gate terminals G1 through Gn of the respective thyristors S1 through Sn are connected to a power line 16 via resistors R1 through Rn which are provided so as to correspond to the respective thyristors S1 through Sn, respectively. In addition, the power line 16 is grounded (GND).

The gate terminals G1 through Gn of the thyristors S1 through Sn are, respectively, connected to the gate terminals of the light-emitting diodes L1 through Ln which are provided so as to correspond to the respective thyristors S1 through Sn.

Further, anode terminals of the diodes CR1 through CRn are connected to the gate terminals G1 through Gn of the respective thyristors S1 through Sn. Cathode terminals of the diodes CR1 through CRn are, respectively, connected to the gate terminals of the next stage. That is, the respective diodes CR1 through CRn are connected to each other in series.

The anode terminal of the diode CR1 is connected to the cathode terminal of the diode CR0, and the anode terminal of the diode CR0 is connected to the signal generation circuit 42 via the resistor RS. Further, the cathode terminals of the light-emitting diodes L1 through Ln are connected to the signal generation circuit 42 via the resistor RID. Still further, the light-emitting diodes L1 through Ln are composed of AlGaAsP or GaAsP as an example, and its band gap is approximately 1.5V.

Figure 5:
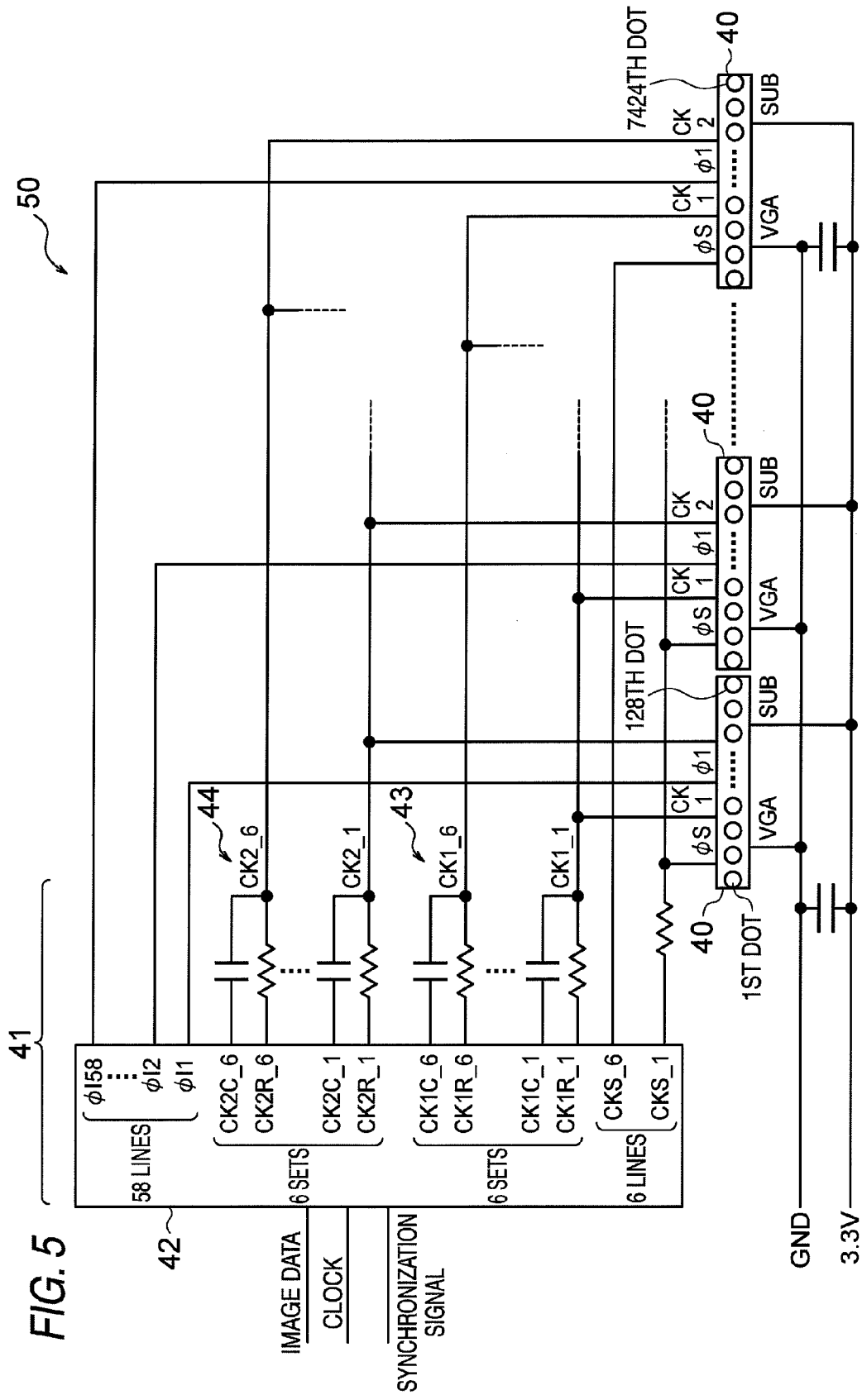
FIG. 5 is a circuit diagram showing the light-emitting element array driving unit of the image forming apparatus according to one exemplary embodiment of the present invention.

FIG. 5 is a circuit diagram showing the light-emitting element array driver 50.

FIG. 5 shows the configuration of recording on an A3-sized recording sheet at 600 dpi (dot per inch) and driving a 7424-dot LED element. That is, the LED print head 20 according to this exemplary embodiment has fifty eight LED chips 40, each of which is composed of 128 dots.

In FIG. 5, ID that is an LED lighting signal is provided for each LED chip 40, and 58 IDs are arranged in total. Also, each of the transfer signals CK1, CK2, CKS drive 9 or 10 chips. Six sets of the transfer signals CK1, CK2, CKS are arranged in total. The level shift circuits 43 and 44 (see FIG. 4) are provided for each of the sets. With this configuration, the drive capacity for each of the transfer signals CK1, CK2 and CKS is reduced, and all the LED chips 40 are driven in a stabilized state at a low voltage.

Self-scanning LEDs are adopted in the LED print head 20. The self-scanning LEDs employ the thyristor structure as a portion corresponding to a switch that selectively turns on and turns off the light-emitting points. By using the thyristor structure, the switching portions are disposed on the same chip as the light-emitting points. In addition, since the turn-on timing and turn-off timing of the switch are selectively controlled for lighting by two signal lines, wherein the data line can be made common, and the wiring thereof is simplified.

Figure 6:
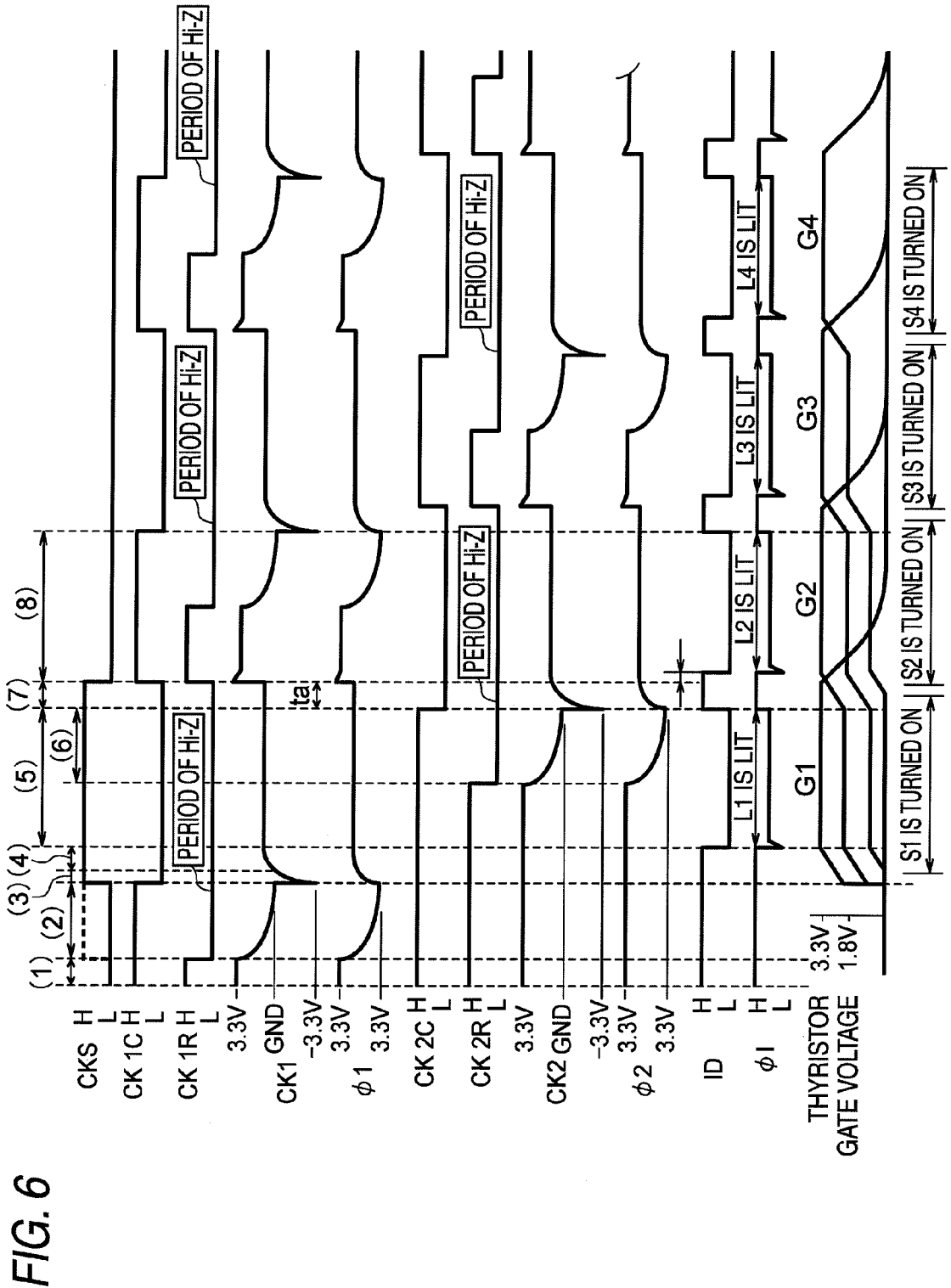
FIG. 6 is a timing chart of operations of respective parts of the light-emitting element array of the image forming apparatus according to one exemplary embodiment of the present invention.

Next, description is given on operations of the light-emitting element array driver 50 shown in FIG. 4 with reference to a timing chart shown in FIG. 6. In FIG. 6, by showing the symbols, which are assigned to the signal lines in FIG. 4, it is made clear to which signals of the circuit in FIG. 4 the respective signals correspond. Also, in the following description, description is given on the case where four thyristors (n=4) are provided, as an example.

(1) First, in a default state, all the thyristors S1, S2, S3 and S4 are turned off since no current flows thereto (FIG. 6(1)).

Figure 7:
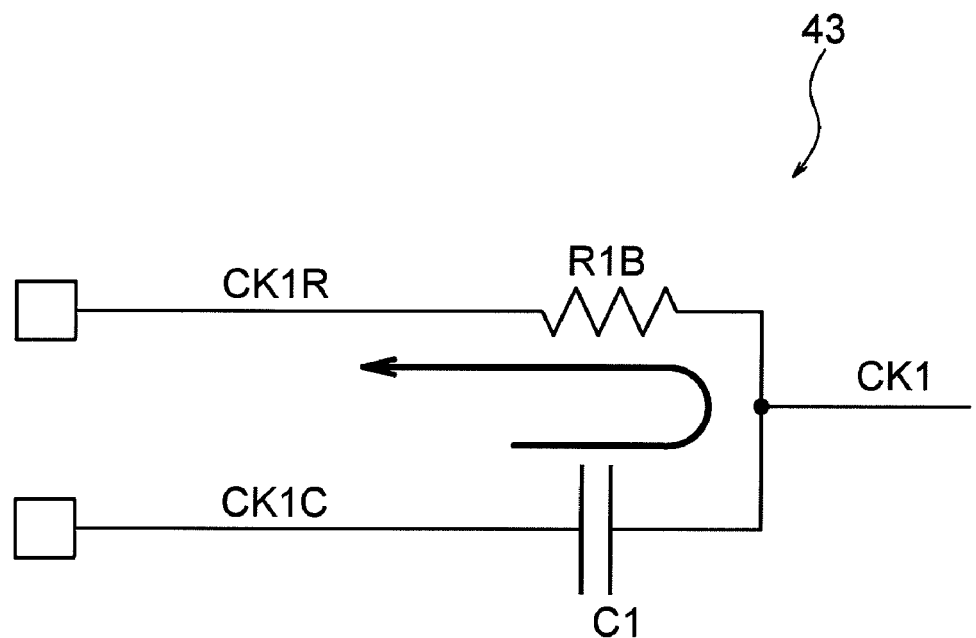
FIG. 7 is a view showing current flows in a level shift circuit when a transfer signal CK1R is turned from a default level to an L level in the image forming apparatus according to one exemplary embodiment of the present invention.

(2) As the transfer signal CK1R is brought from the default state to an L level (FIG. 6(2)), current flows through the level shift circuit 43 in a direction of an arrow as shown in FIG. 7, and a potential of the transfer signal CK1 becomes GND. Since the potential of the transfer signal CK1 is 3.3V in this example, a potential difference between the both ends of the capacitor C1 is 3.3V (VDD). In this case, as shown by the dotted-line in the timing of FIG. 6(2), the transfer signal CKS may be set to a H level.

(3) Simultaneously therewith, if the transfer signal CKS is set to the H level and the transfer signal CK1C is set to an L level (FIG. 6(3)), the potential of the transfer signal CK1 becomes approximately −3.3V since electric charge is accumulated in the capacitor C1. Also, the potential of the gate G1 becomes $\phi$S potential−Vf=approximately 1.8V. Here, the $\phi$S potential is approximately 3.3V, and Vf means a forward direction voltage of the diode of AlGaAs and is approximately 1.5V. Further, $\phi$1 potential=G1 potential−Vf=0.3V is brought about. Therefore, a potential difference of approximately 3.7V is produced between the signal line $\phi$1 and the transfer signal CK1.

Figure 8:
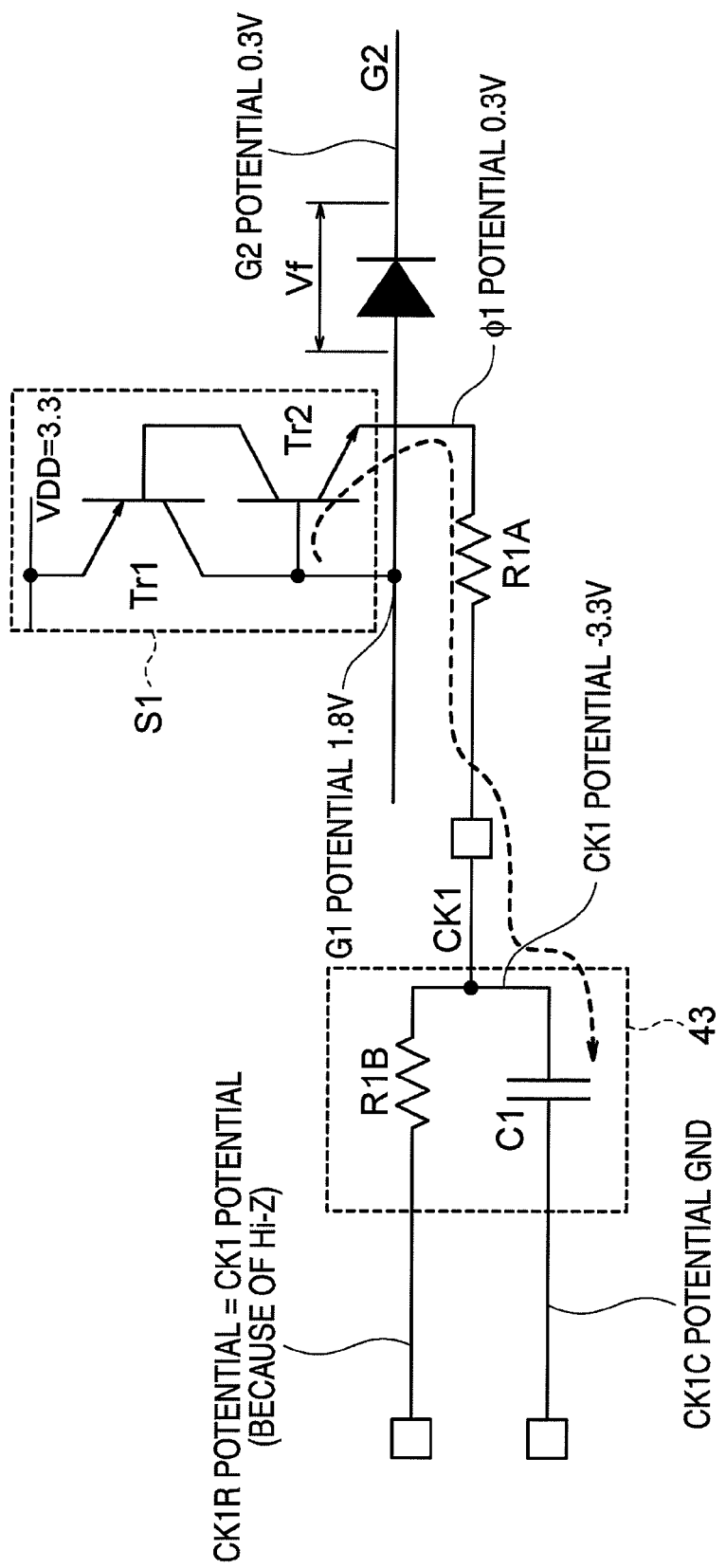
FIG. 8 is a view showing current flows immediately after the transfer signal CKS is turned to a H level and CK1C is turned to an L level in the image forming apparatus according to one exemplary embodiment of the present invention.

And, in this state, gate current of the thyristor S1 begins flowing in the route of the gate G1→signal line $\phi$1→transfer signal CK1 as shown in FIG. 8. At this time, a tri-state buffer B1R is turned into a high impedance (Hi-Z), wherein reverse flow of the current is prevented.

After that, Tr2 is turned on by the gate current of the thyristor S1, and the base current of Tr1 (collector current of Tr2) is caused to flow, and Tr1 is turned on, thereby causing the thyristor S1 to start turning on, and the gate current to gradually rise. In line therewith, since current flows in the capacitor C1 of the level shift circuit 43, the potential of the transfer signal CK1 gradually rises.

(4) After a predetermined duration of time (that is, a time period in which the potential of the transfer signal CK1 is brought into the vicinity of GND) elapses, the tri-state buffer B1R of the signal generation circuit 42 is brought to an L level (FIG. 6(4)). If so, the potential of the signal line $\phi$1 rises, and the potential of the transfer signal CK1 rises in line with a rise in the potential of the gate G1. Further, in line therewith, current begins flowing to the resistor R1B side of the level shift circuit 43. On the other hand, the current flowing in the capacitor C1 of the level shift circuit 43 gradually decreases in line with a rise in the potential of the transfer signal CK1.

Figure 9:
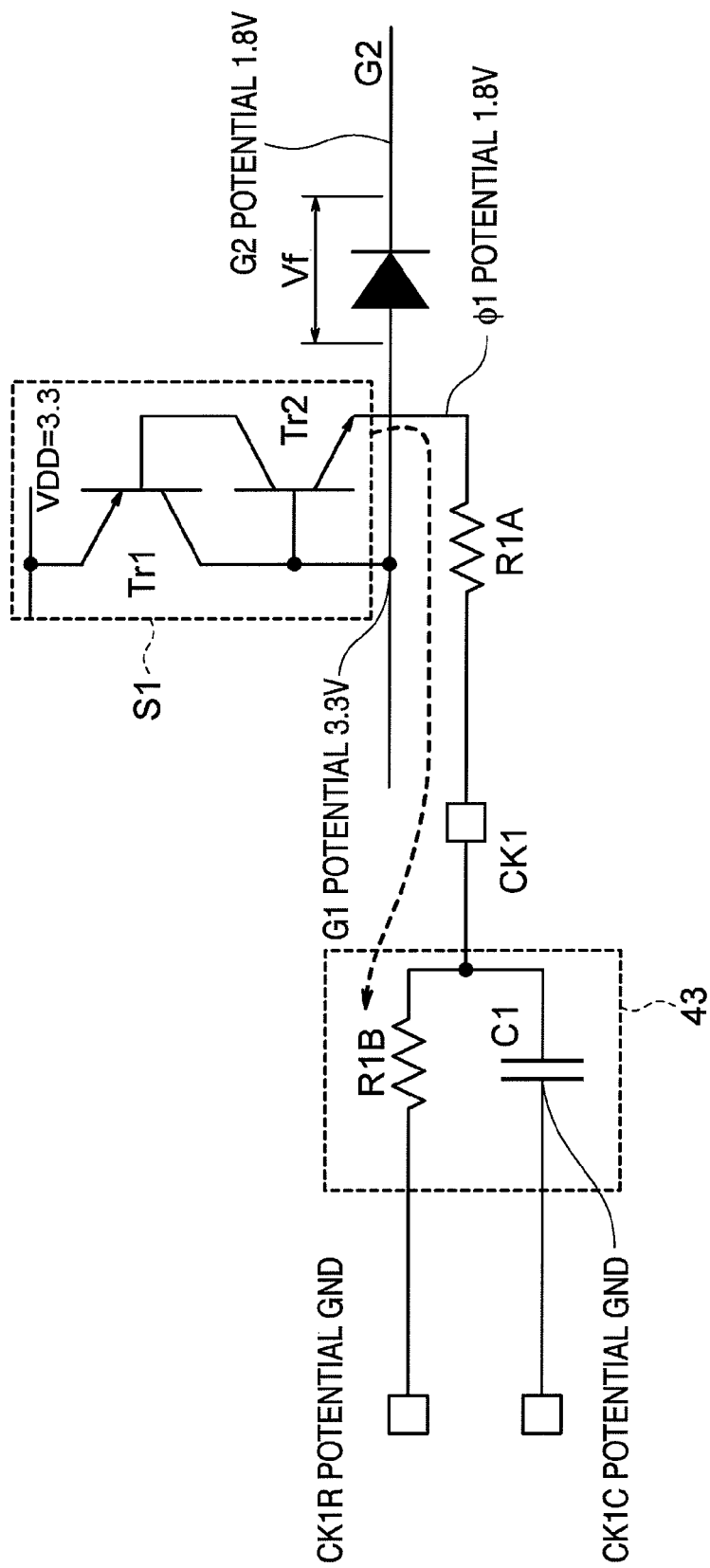
FIG. 9 is a view showing potentials of respective parts in a steady state where a thyristor S1 is completely turned on, in the image forming apparatus according to one exemplary embodiment of the present invention.

Then, as the thyristor S1 is completely turned on and is brought into a steady state, the potentials of the respective signal lines become as shown in FIG. 9. That is, although current to keep the thyristor S1 in a turned-on state flows in the resistor R1B of the level shift circuit 43, no current flows in the capacitor C1. Further, the potential of the transfer signal CK1 is CK1 potential=1.8−1.8×R1B/(R1A+R1B).

(5) The lighting signal ID is brought to an L level with the thyristor S1 being completely turned on (FIG. 6(5)). At this time, since the gate G1 potential is larger than the gate G2 potential (Gate G1 potential−Gate G2 potential=1.8V), the LED L1 of the thyristor structure is turned on earlier and is lit. In line with lighting of the LED L1, the potential of the signal line $\phi$1 rises to cause signal line $\phi$1 potential=gate G2 potential=1.8V to be brought about. Therefore, the LEDs including LED L2 and subsequent LEDs will not be turned on. That is, among the LEDs L1, L2, L3, L4 . . . , only the LED having the highest gate voltage is turned on (lit).

Figure 10:
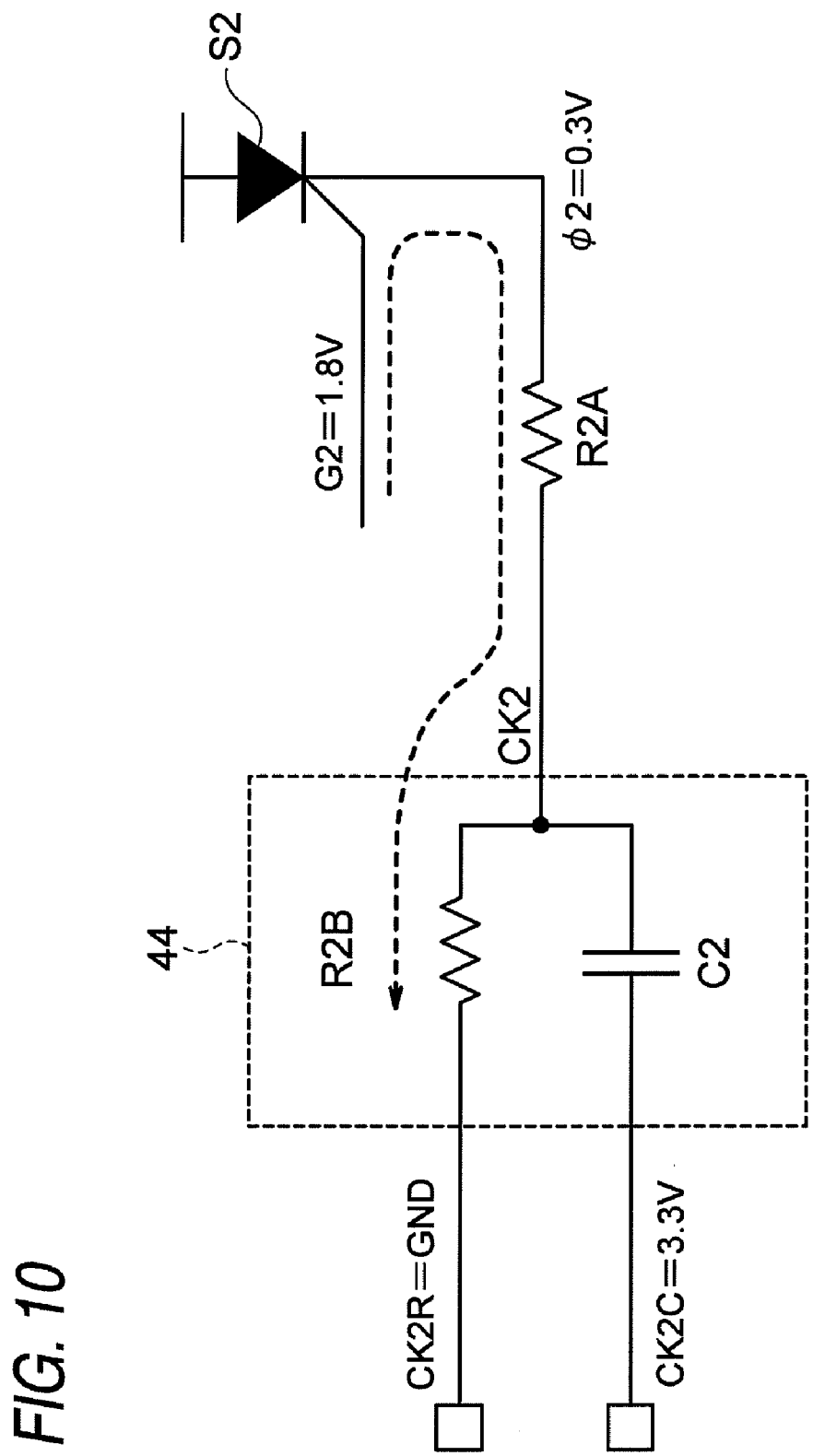
FIG. 10 is a view showing a state, where gate current flows through a thyristor S2, in the image forming apparatus according to one exemplary embodiment of the present invention.

(6) Next, as the transfer signal CK2R is set to an L level (FIG. 6(6)), current flows as in the case of FIG. 6(2), and a voltage is generated between the both ends of the capacitor C2 of the level shift circuit 44. In a steady state immediately before the step of FIG. 6(6) is finished, since the gate G2 potential is 1.8V, the voltage values at the respective points slightly differ from those in the case of FIG. 6(2). However, no influence is brought about. The reason is as described below. The potential of the signal line $\phi$2 is 0.3V or so (=Gate G2 potential−Vf=1.8V−1.5V) in a steady state immediately before the step of FIG. 6(6) is finished. Therefore, the gate current flows to the thyristor S2 in the dotted line direction as shown in FIG. 10. However, since this gate current is only slight, the thyristor S2 is not turned on. In this case, the transfer signal CK2 potential is roughly 0.15V or so (=CK2 potential=0.3−0.3×R2B/(R2A+R2B)).

(7) If the transfer signal CK2C is set to an L level in this state (FIG. 6(7)), the thyristor switch S2 is turned on.

(8) Then, if the transfer signals CK1C and CK1R are simultaneously set to the H level (FIG. 6(8)), the thyristor switch S1 is turned off, and the gate G1 potential gradually falls by discharge through the resistor R1. At this time, the gate G2 of the thyristor switch S2 becomes 3.3V, and is completely turned on. Therefore, by bringing lighting signal ID terminals corresponding to image data to L level/H level, the LED L2 can be brought into lighting and non-lighting. Also, in this case, since the gate G1 potential has already been lower than the gate G2 potential, the LED L1 will not be turned on.

Thus, according to the light-emitting element array driver 50, since the ON state of the thyristor switches of the thyristors S1, S2, . . . Sn can be changed by alternately driving the transfer signals CK1 and CK2, the LEDs L1, L2, . . . Ln are selectively controlled for lighting or non-lighting through time sharing.

Figure 11:
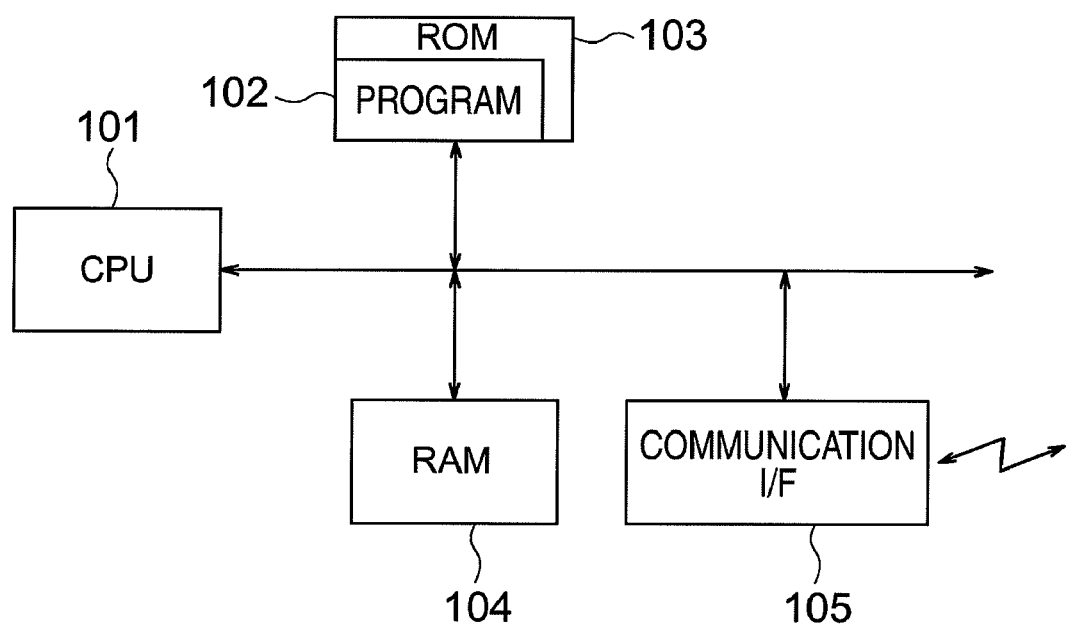
FIG. 11 is a block diagram of a control system of the LED array in the image forming apparatus according to one exemplary embodiment of the present invention.

FIG. 11 is a block diagram of a control system of the LED array 23 that becomes an exposure device.

In this control system, a ROM 103, a RAM 104, a communication interface (I/F) 105 are connected to a CPU 101 that collectively controls respective parts. The ROM 103 stores various types of control programs 102 executed by a CPU 101 and fixed data. The RAM 104 serves a work area of the CPU 101. The communications interface (I/F) 105 executes communications with the LED array 23. The control programs 102 may be stored in advance at the beginning of production of the image forming apparatus. Alternatively, the control programs may be set up in a storage device by reading the same later from a storage medium having the control programs 102 stored therein or downloading the same via communications tool such as the Internet.

Figure 12:
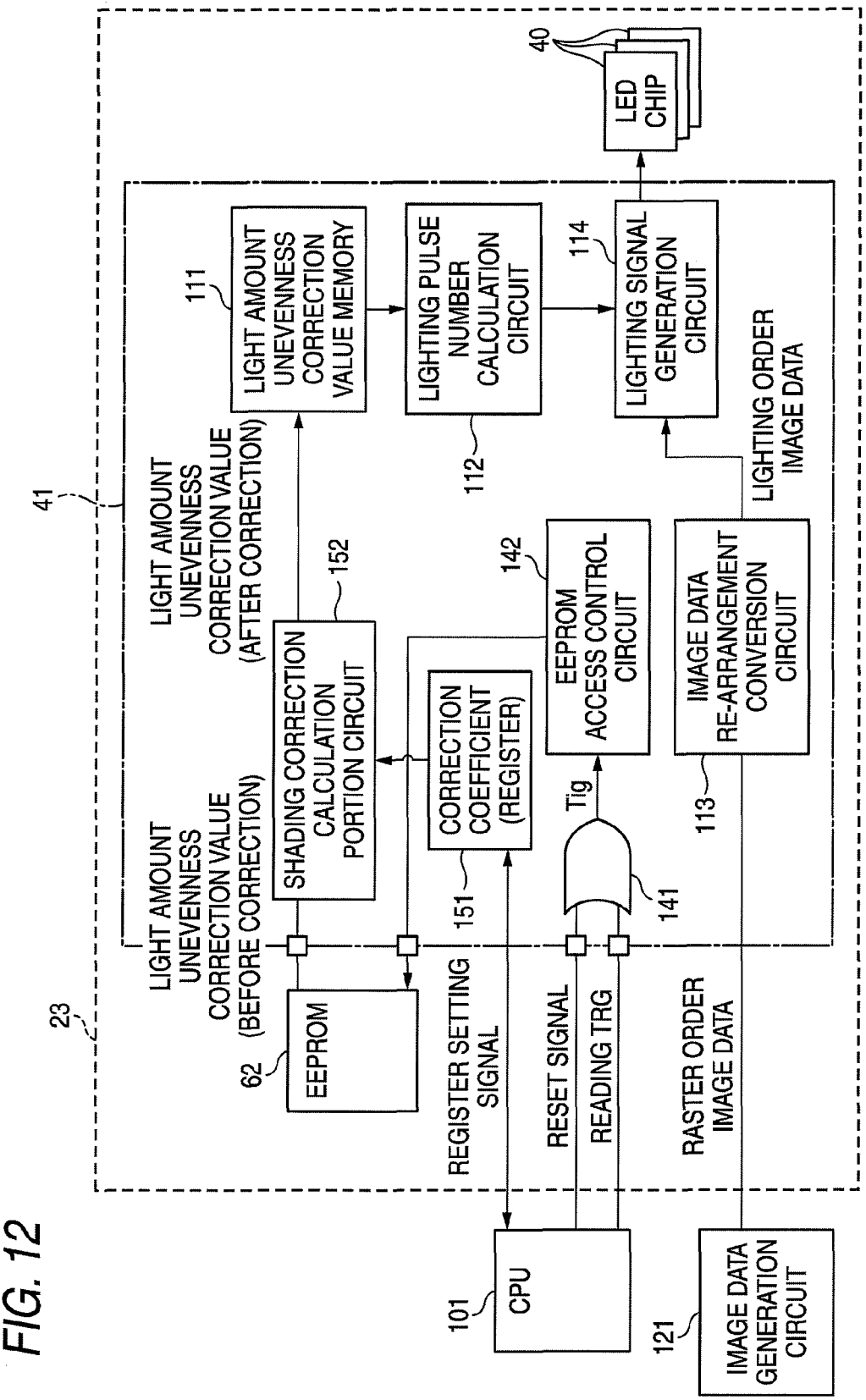
FIG. 12 is a circuit diagram of circuits with focusing on the drive unit in the image forming apparatus according to one exemplary embodiment of the present invention.

FIG. 12 is a circuit diagram showing the circuits with focusing on the driver 41.

Individual LEDs of the LED chip 40 are not uniform and are uneven in the light-emitting amount thereof. Thus, it is necessary to make it uniform by correcting unevenness (mura) in the amount of light. In this case, light amount unevenness correction data is stored in EEPROM 62 of the LED array 23. The light amount unevenness correction data stored in the EEPROM 62 is all read out into a light amount unevenness correction memory 111 implemented by a RAM.

The CPU 101 outputs a reset signal to the driver 41 whenever the main power of the image forming apparatus is turned on. Also, the CPU 101 outputs a reading signal TRG to the driver 41 when it is detected by a sensor (not illustrated) inside the image forming apparatus that the light amount of the LED array 23 has partially fallen. An OR circuit 141 outputs a Trg signal to the EEPROM access control circuit 142 when the reset signal or the TRG signal is output, and the EEPROM access control circuit 142 controls so that light amount unevenness correction values are read from the EEPROM 62 and are input into the light amount unevenness correction value memory 111.

A lighting pulse number calculation circuit 112 calculates a light-emitting time of LED per dot image based on the light amount unevenness correction data stored in the light amount unevenness correction value memory 111. In this exemplary embodiment, the light-emitting power of the respective LEDs is controlled by controlling the light-emitting time. Raster image data (image data in order from an edge of a printing image) generated by an image data generation circuit 121 is converted to lighting order image data by an image data re-arrangement conversion circuit 113 of the driver 41, and is transmitted to a lighting signal generation circuit 114.

Figure 13:
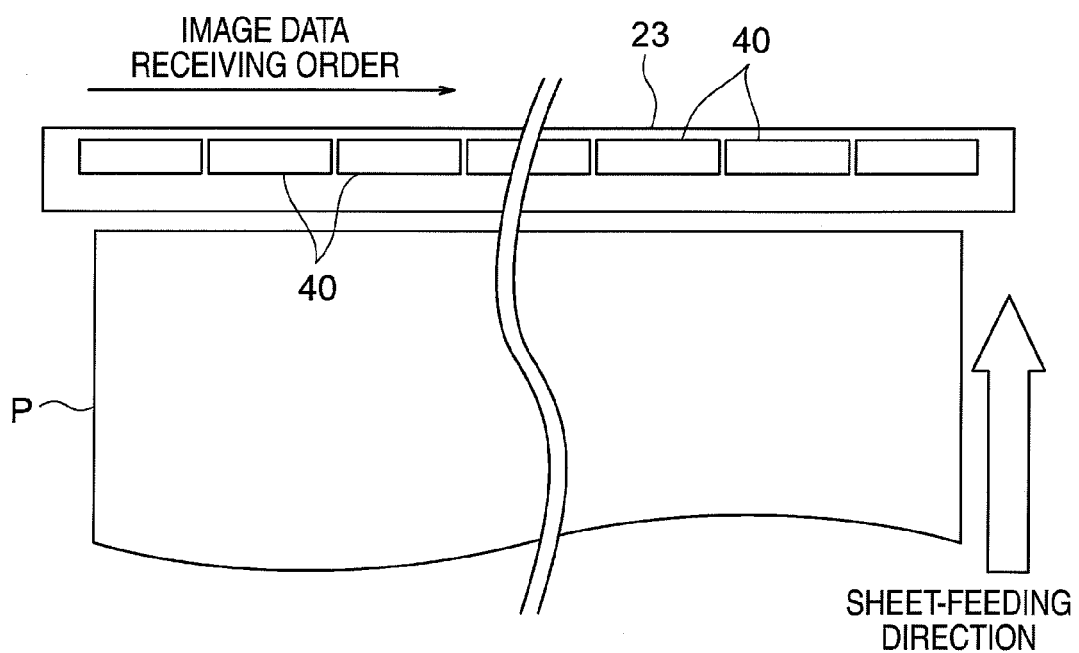
FIG. 13 is a schematic view showing the LED array in the image forming apparatus according to one exemplary embodiment of the present invention.

FIG. 13 is a schematic view of the LED array 23.

The LED array 23 in FIG. 13 does not accurately express the array of the LED chips 40 as in FIG. 3, but is shown in a single row extending in the left and right direction for convenience. Herein, a relationship between the LED chip 40 of the LED array 23 and a sheet feeding direction of a sheet P is shown. In raster image data, image data of respective dots are arranged in order of an arrow that is shown as an image data receiving order.

Figure 14:
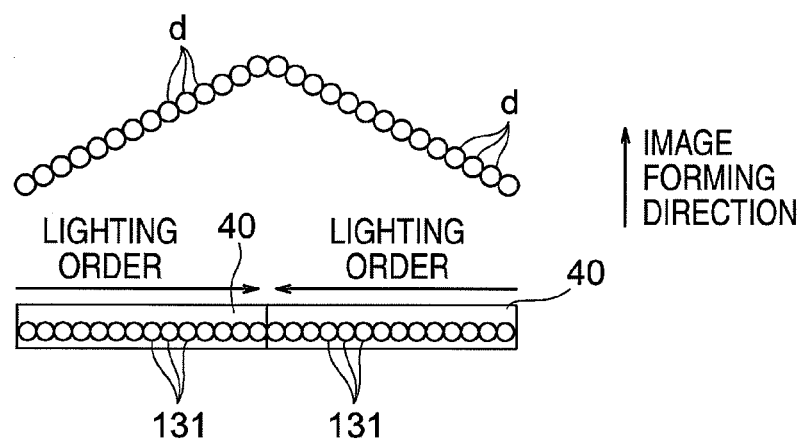
FIG. 14 is an enlarged plan view showing LED chips in the image forming apparatus according to one exemplary embodiment of the present invention.

FIG. 14 is an enlarged plan view of the LED chip 40.

Plural LEDs are arranged in a row in the respective LED chips 40, and are shown with reference numeral 131. In this example, the respective LEDs 131 of the light side LED chip 40 are lit in order from the left end thereof. The respective LEDs 131 of the right side LED chip 40 in parallel thereto are lit in order from the right end thereof. In this case, dots formed by the respective LEDs 131 are shown with reference symbol "d." The lighting order image data is such data that respective dots of image data are arranged in order matched to the lighting order of such respective LED chips 40.

Returning to FIG. 12, the lighting signal generation circuit 114 drives the respective LED chips 40 based on the lighting order image data. In this case, the lighting time of each dot is determined by the lighting pulse number calculated by the lighting pulse number calculation circuit 112, thereby correcting unevenness in the amount of the light.

On the other hand, distances between the respective LEDs of the LED chip 40 and the photosensitive bodies 1A, 1B, 1C and 1D (hereinafter, may be referred to as the photosensitive body 1A as the representative) vary in positions on the photosensitive body 1A due to assembling errors of components. Therefore, there may be cases where a formed image may be partially thin or pale. Also, a toner remaining on the photosensitive body 1A after an image is formed is scraped off by a blade. Therefore, abrasion unevenness may occur on the surface thereof, and unevenness (mura) in the sensitivity may be brought about even if the same light amount is received from the LEDs.

Accordingly, in order to correct image unevenness (mura) brought by such assembling errors of components and unevenness (mura) in sensitivity of the photosensitive body, shading correction is executed in this exemplary embodiment.

That is, the CPU 101 stores shading correction coefficients for shading correction in a register 151, and a shading correction calculation circuit 152 corrects the light amount unevenness correction values, which are stored in the EEPROM 62, based on the shading correction coefficients, and the corrected light amount unevenness correction values are stored in the light amount unevenness correction value memory 111.

Figure 15:
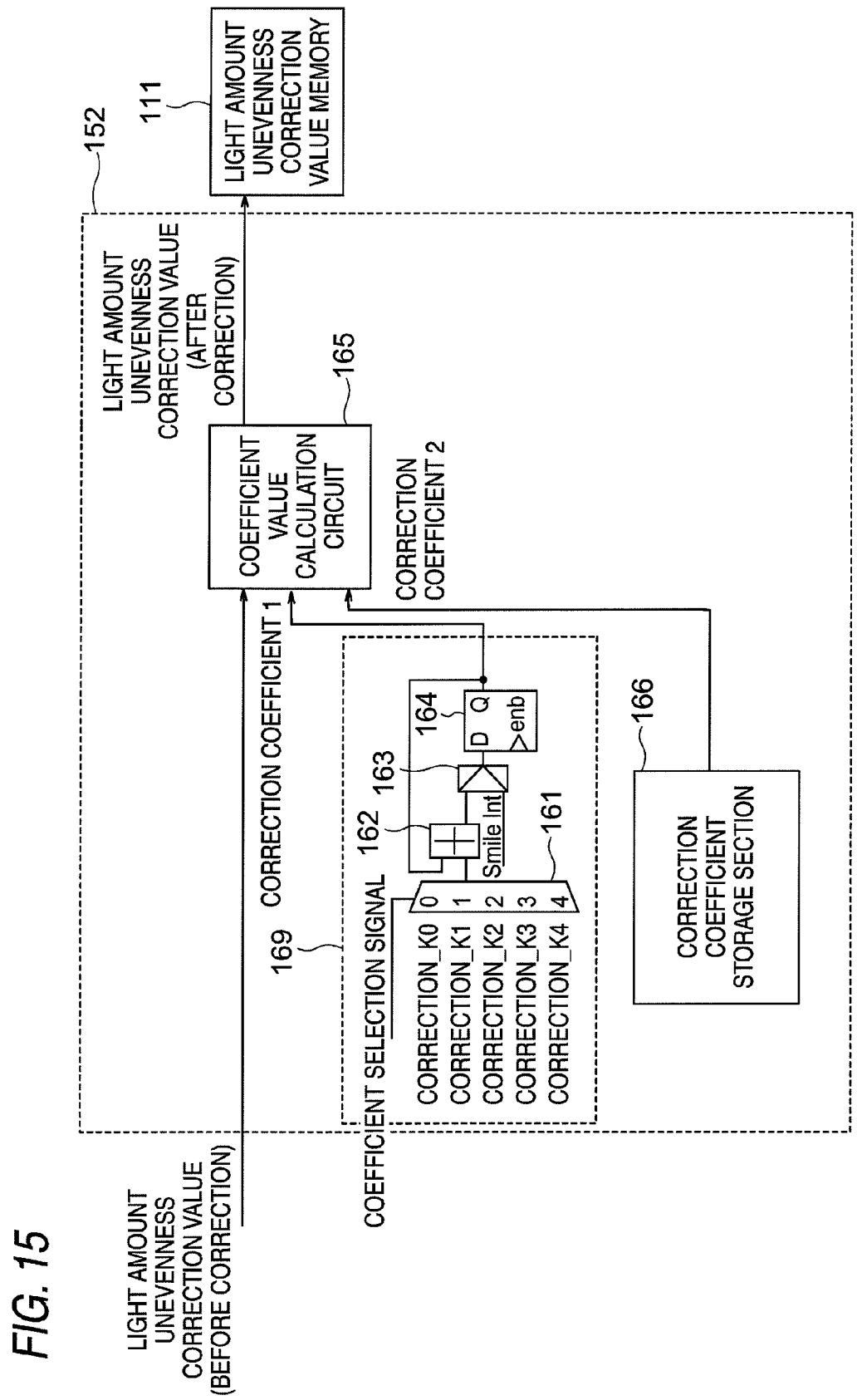
FIG. 15 is a circuit diagram showing a shading correction calculation circuit in the image forming apparatus according to one exemplary embodiment of the present invention.

FIG. 15 is a circuit diagram of the shading correction calculation circuit 152.

The shading correction coefficients used in this example include five correction coefficients of $correction_{K0}$, $correction_{K1}$, $correction_{K2}$, $correction_{K3}$ and $correction_{K4}$. A selector 161 of a correction coefficient calculation section 169 selects one of the five shading correction coefficients based on a coefficient selection signal. An adder 162 adds an output value of a D flip flop 164 to the shading correction coefficient thus selected. A selector 163 outputs one of the $correction_{int}$ being an initial value of the corrected light amount unevenness correction value (the light amount unevenness correction value subjected to the shading correction) and the value output by the adder 162. In this case, the $correction_{int}$ is selected as an initial value, and thereafter the value output by the adder 162 is selected. The D flip flop 164 holds the selected value and outputs it to a correction value calculation circuit 165 as a correction coefficient 1.

A correction coefficient storage section 166 stores correction data of respective LEDs (for example, 256 LEDs) for each LED chip 40. This is correction data to correct a light amount unevenness which is generated in units of the LED chips 40 due to deterioration of the product. The correction data stored in the correction coefficient storage section 166 are output to the correction value calculation circuit 165 as a correction coefficient 2.

The correction value calculation circuit 165 corrects the light amount unevenness correction values based on the correction coefficients 1 and 2, and stores the corrected light amount unevenness correction values in the light amount unevenness correction value memory 111.

Figure 16:
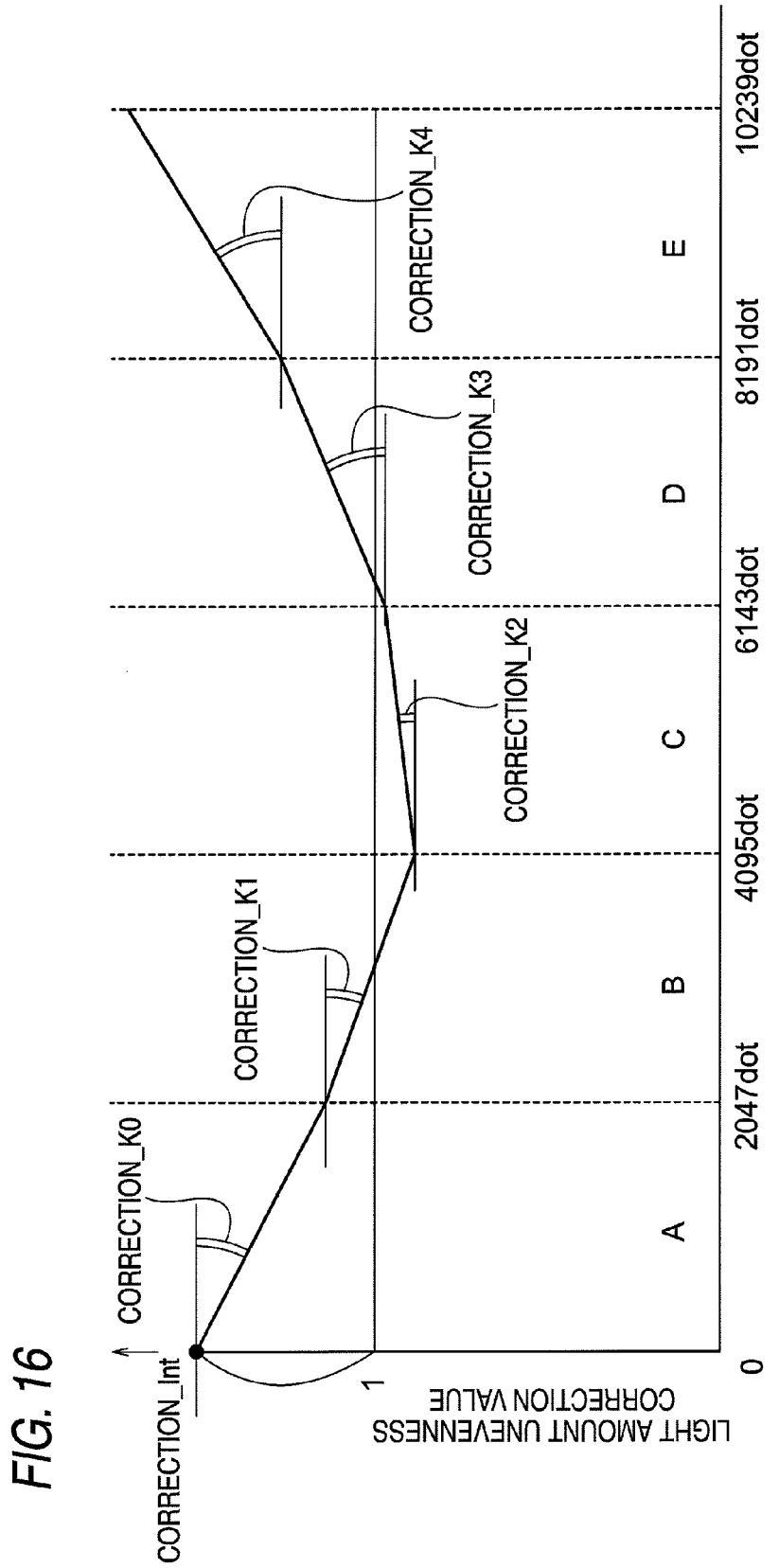
FIG. 16 is a graph showing correction of light amount unevenness correction values based on a correction coefficient 1 in the image forming apparatus according to one exemplary embodiment of the present invention.

FIG. 16 is a graph showing correction of the light amount unevenness correction values based on the correction coefficient 1.

The horizontal axis of the graph indicates the respective LEDs of the LED array 20, and the vertical axis of the graph indicates the light amount unevenness correction values.

In this case, for a predetermined range of the LEDs, the same shading correction coefficient is commonly used. In this example, the correction$_{K0}$ of the shading correction coefficient is applied in the interval from 0 through 2047 dots, and the other correction$_{K1}$, correction$_{K2}$, correction$_{K3}$ and correction$_{K4}$ are applied in respective fixed intervals. Since the adder 162 always adds the same shading correction coefficient to the light amount unevenness correction values of a dot just prior to a current dot in the same interval, the light amount unevenness correction value simply increases or simply decreases at a fixed ratio in one interval. In this example, correction is executed using the correction$_{int}$ as the initial value so that the light amount unevenness correction value becomes large at both end parts of the LED array 23 and that the light amount unevenness correction value becomes small in the middle part of the LED array 23.

In the circuit described above, the shading correction calculation circuit 152 corrects the light amount unevenness correction values through calculations. Hereinafter, description is given on the circuit configuration according to this exemplary embodiment, in which the load of the calculation process in the shading correction calculation circuit 152 is reduced.

Figure 17:
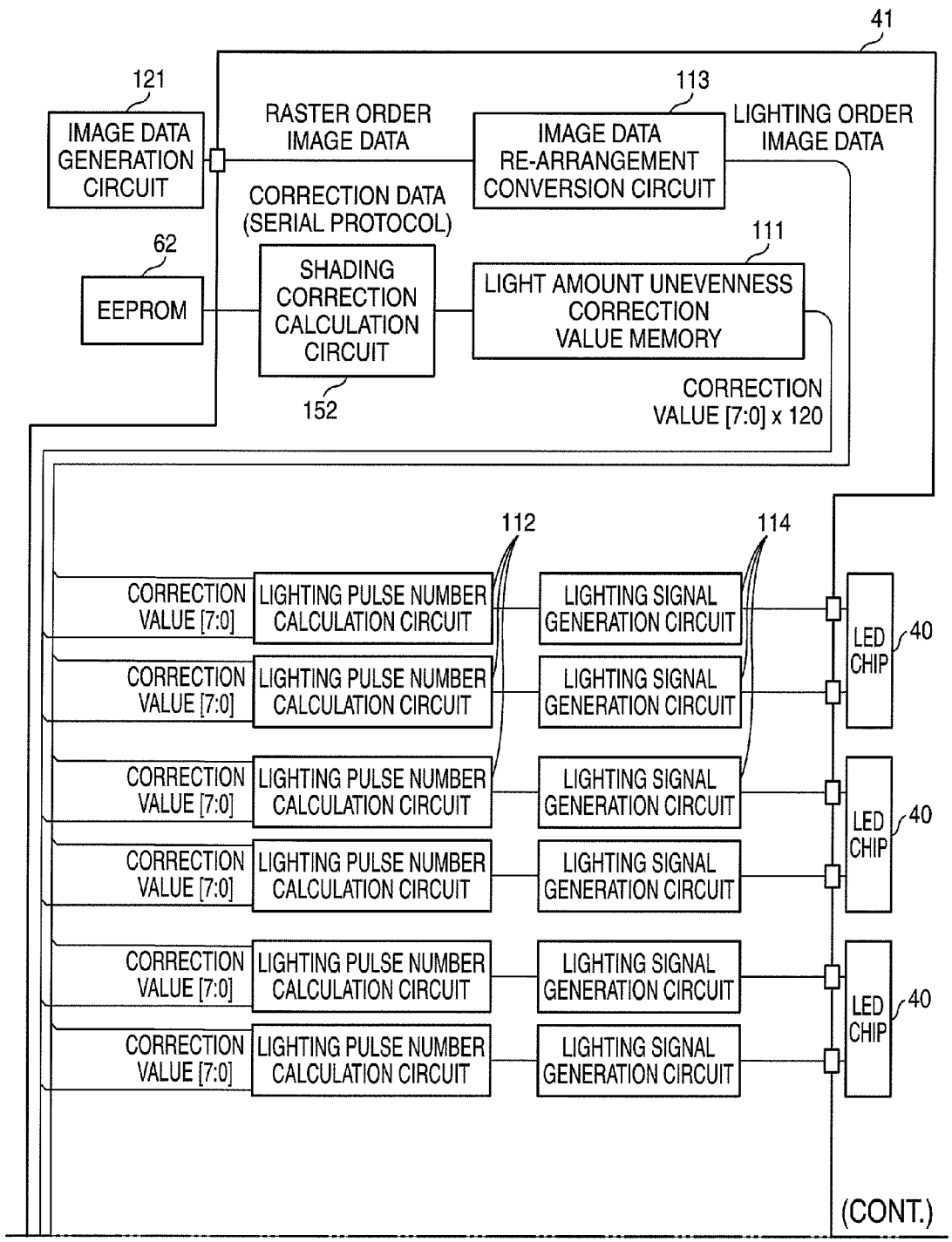
FIG. 17 is a circuit diagram showing circuits with focusing on the drive unit in the image forming apparatus according to one exemplary embodiment of the present invention.

FIG. 17 is a circuit diagram showing circuits with focusing on the driver 41.

Since the plural LED chips 40 are provided, the driver 41 is also provided with plural lighting signal generation circuits 114 and plural lighting pulse number calculation circuits 112.

The light amount unevenness correction values transmitted from the EEPROM 62 require 8 or more clocks for each of 8-bit data in the case of serial protocol. If a communication rate is set to 5 Mhz or so at a maximum, it takes approximately 2 μsec that a light amount unevenness correction value of one LED is transmitted to the shading correction circuit 152.

It is assumed that an image forming process speed is 200 mm/sec, and that a resolution in the sub-scanning direction is 1200 dpi. Also, it is assumed that there are sixty LED chips 40 each of which 105 μsec is assigned in an exposure time for one line, that, that two lighting signal generation circuits 114 and two lighting pulse number calculation circuits 112 are provided for each LED chip, that the simultaneous LED lighting number is 120 dots, and that 256 LEDs are provided in each LED chip 40. In this case, it is necessary that 120 pieces of data are processed during 105 μsec, and this process is executed 128 times. Therefore, it would be necessary to execute the processing per dot within approximately 800 ns (120 LEDs are simultaneously processed).

The reset signal is output from the CPU 101 when the main power source of the image forming apparatus is turned on. The light amount unevenness correction values are transmitted from the EEPROM 62 to the shading correction calculation circuit 152. Then, the shading correction calculation circuit 152 may correct the light amount unevenness correction values one after another in the receiving order, and the corrected light amount unevenness correction values are stored in the light amount unevenness correction value memory 111.

In this manner, all the light amount unevenness correction values are once corrected, and all the corrected light amount unevenness correction values are stored in the light amount unevenness correction value memory 111. Then, when an image is to be formed, each lighting pulse number calculation circuit 114 reads the light amount unevenness correction value of a corresponding one of the dots which each circuit 114 is in charge of, from the light amount unevenness correction value memory 111, and calculates the lighting time of the corresponding one of the dots.

Figure 18:
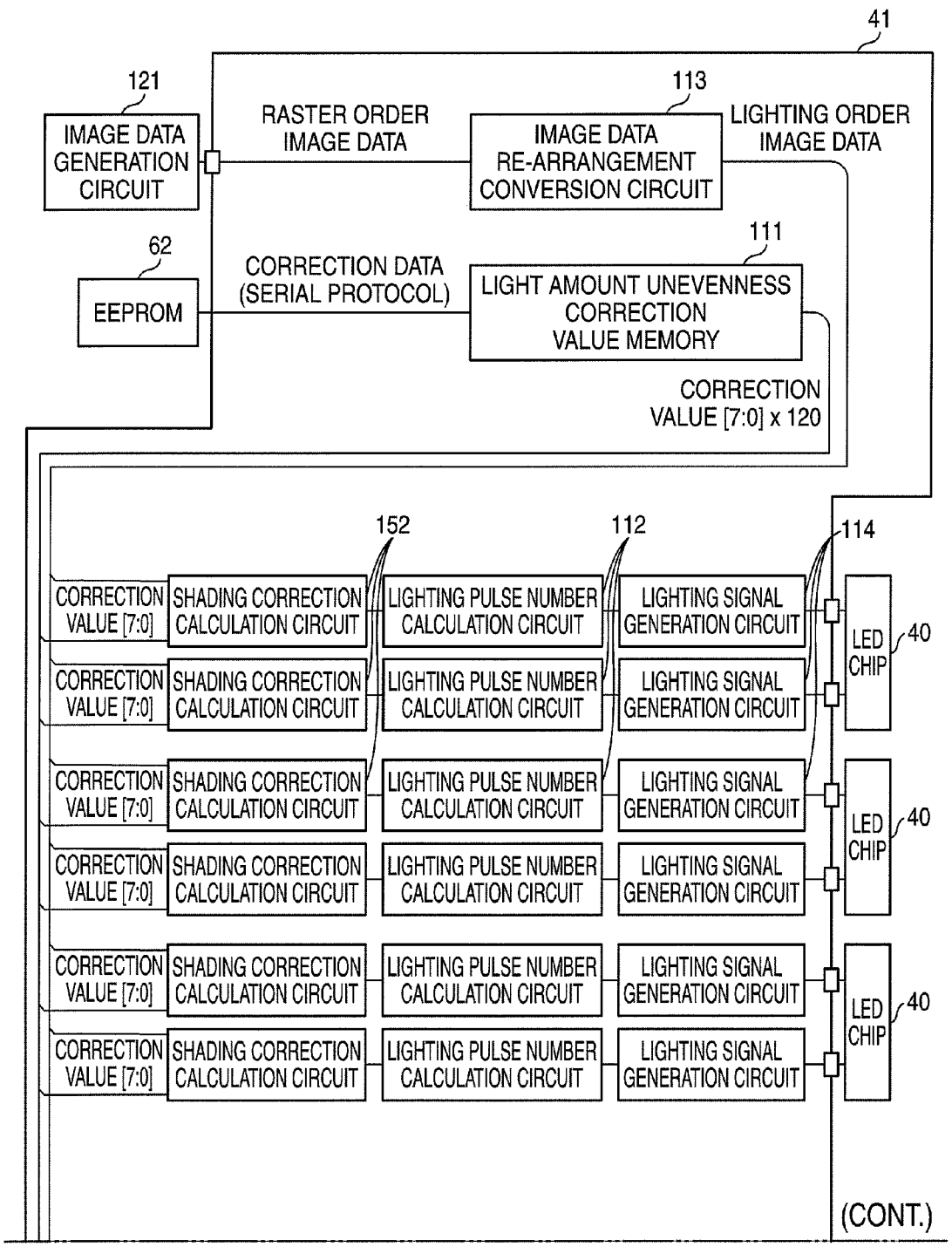
FIG. 18 is a circuit diagram showing circuits with focusing on the drive unit of a related art.

FIG. 18 is a circuit diagram of circuits with focusing on the driver 41 according to a related art.

When the circuit of FIG. 18 is compared with the circuit according to this exemplary embodiment of FIG. 17, the shading correction calculation circuit 152 is not provided at a preceding stage of the light amount unevenness correction value memory 111 but is provided at a subsequent stage thereof. Also, the plural shading correction calculation units 152 are provided so as to correspond to the respective lighting pulse number calculation circuits 112.

Therefore, light amount unevenness correction values for which shading correction has not been performed are stored in the light amount unevenness correction value memory 111. When an image is to be formed, each shading correction calculation circuit 152 reads the light amount unevenness correction value from the light amount unevenness correction value memory 111, calculates the light amount unevenness correction value for which the shading correction has been executed, and transmits it to the lighting pulse number calculation circuit 112.

In such a circuit configuration of the related art, calculation of the light amount unevenness correction values for which shading correction has been executed is carried out when an image is formed. Therefore, it is necessary to calculate the light amount unevenness correction values, for which shading correction has been executed, corresponding to image data transmitted one after another. Therefore, the load of calculation processes is increased. Further, the respective shading correction calculation circuit 152 does not correct the light amount unevenness correction values transmitted from the EEPROM 62 one after another, but it is necessary for the shading correction calculation circuit 152 to selectively read only the light amount unevenness correction values, which will be required in the respective shading correction calculation circuits 152. Therefore, the load of the calculation processes will be further increased. In addition, since the plural shading correction calculation circuits 152 are provided so as to correspond to the respective lighting pulse number calculation circuits 112, the circuit configuration will also be large-sized.

The foregoing description of the exemplary embodiments of the present invention has been provided for the purposes of illustration and description. It is not intended to be exhaustive or to limit the invention to the precise forms disclosed. Obviously, many modifications and variations will be apparent to practitioners skilled in the art. The embodiments were chosen and described in order to best explain the principles of the invention and its practical applications, thereby enabling others skilled in the art to understand the invention for various embodiments and with the various modifications as are suited to the particular use contemplated. It is intended that the scope of the invention be defined by the following claims and their equivalents.

What is claimed is:

1. An exposure device comprising:
a plurality of light-emitting elements;
a lighting driver that drives and lights up the light-emitting elements based on image data;
a first storage that stores light amount unevenness correction values of the respective light-emitting elements;
a reader that reads the light amount unevenness correction values stored in the first storage;
a shading correction unit that executes shading correction for the light amount unevenness correction values read by the reader; and
a second storage that stores correction values obtained by having the shading correction unit to execute the shading correction for the light amount unevenness correction values, wherein
the lighting driver controls light power of the respective light-emitting elements based on the correction values stored in the second storage,
wherein the shading correction unit is provided at a preceding stage of the second storage,
wherein the shading correction unit executes shading correction for the light amount unevenness correction values read by the reader by using a first correction coefficient output from a correlation coefficient calculation section and a second correction coefficient output from a correction coefficient storage section, and the second correlation coefficient corrects at least one of the light amount evenness of the light-emitting elements and abrasion evenness on a surface of photosensitive bodies,
wherein the correlation coefficient calculation section comprises:
a first selector that selects a first intermediate selection signal from a plurality of correction coefficients based on a coefficient selection signal;
a flip flop that outputs the second correction coefficient based on a second intermediate signal;
an adder that adds the output of the flip flop with the first intermediate selection signal and outputs an added signal; and
a second selector that selects one of an initial correction value and the added signal and sends the second intermediate signal to the flip flop.

2. An image forming apparatus comprising:
a photosensitive body;
an exposure device that forms a latent image on the photosensitive body; and
a developing device that develops the latent image, wherein
the exposure device includes
a plurality of light-emitting elements,
a lighting driver that drives and lights up the light-emitting elements based on image data,
a first storage that stores light amount unevenness correction values of the respective light-emitting elements,
a reader that reads the light amount unevenness correction values stored in the first storage,
a shading correction unit that executes shading correction for the light amount unevenness correction values read by the reader, and
a second storage that stores correction values obtained by having the shading correction unit to execute the shading correction for the light amount unevenness correction values, and
the lighting driver controls light power of the respective light-emitting elements based on the correction values stored in the second storage,
wherein the shading correction unit is provided at a preceding stage of the second storage,
wherein the shading correction unit executes shading correction for the light amount unevenness correction values read by the reader by using a first correction coefficient output from a correlation coefficient calculation section and a second correction coefficient output from a correction coefficient storage section, and the second correlation coefficient corrects at least one of the light amount evenness of the light-emitting elements and abrasion evenness on a surface of the photosensitive body, and
wherein the correlation coefficient calculation section comprises:
a first selector that selects a first intermediate selection signal from a plurality of correction coefficients based on a coefficient selection signal;
a flip flop that outputs the second correction coefficient based on a second intermediate signal;
an adder that adds the output of the flip flop with the first intermediate selection signal and outputs an added signal; and
a second selector that selects one of an initial correction value and the added signal and sends the second intermediate signal to the flip flop.

3. A computer-readable medium storing a program that causes a computer to execute an exposure control process, wherein
an exposure device includes
a plurality of light-emitting elements,
a lighting driver that drives and lights up the light-emitting elements based on image data;
a first storage that stores light amount unevenness correction values of the respective light-emitting elements;
a reader that reads the light amount unevenness correction values stored in the first storage;
a shading correction unit that executes shading correction for the light amount unevenness correction values read by the reader; and
a second storage that stores correction values obtained by having the shading correction unit to execute the shading correction for the light amount unevenness correction values,
the lighting driver controls light power of the respective light-emitting elements based on the correction values stored in the second storage, and the exposure control process comprises:
  controlling the exposure device
    to execute the shading correction for the light amount unevenness correction values stored in the first storage, and
    to store the correction values obtained by the executing of the shading correction in the second storage,
  wherein the shading correction unit is provided at a preceding stage of the second storage,
  wherein the shading correction unit executes shading correction for the light amount unevenness correction values read by the reader by using a first correction coefficient output from a correlation coefficient calculation section and a second correction coefficient output from a correction coefficient storage section, and the second correlation coefficient corrects at least one of the light amount evenness of the light-emitting elements and abrasion evenness on a surface of photosensitive bodies,
  wherein the correlation coefficient calculation section comprises:
    a first selector that selects a first intermediate selection signal from a plurality of correction coefficients based on a coefficient selection signal;
    a flip flop that outputs the second correction coefficient based on a second intermediate signal;
    an adder that adds the output of the flip flop with the first intermediate selection signal and outputs an added signal; and
    a second selector that selects one of an initial correction value and the added signal and sends the second intermediate signal to the flip flop.

* * * * *